United States Patent [19]

Ahlm

[11] Patent Number: 4,520,517
[45] Date of Patent: Jun. 4, 1985

[54] MATTRESS OR PILLOW CONSTRUCTION

[75] Inventor: Lars Ahlm, Ulricehamn, Sweden

[73] Assignee: Timmele Laminering AB, Ulricehamn, Sweden

[21] Appl. No.: 391,689

[22] Filed: Jun. 24, 1982

[30] Foreign Application Priority Data

Sep. 21, 1981 [SE] Sweden ................................ 8105554

[51] Int. Cl.$^3$ .............................................. A47C 27/15
[52] U.S. Cl. .................. 5/481; 297/DIG. 1; 428/71; 428/76; 428/316.6
[58] Field of Search .................. 5/481, 434, 436, 420; 428/71, 314.4, 314.6; 297/DIG. 1

[56] References Cited

FOREIGN PATENT DOCUMENTS 1427619 3/1976 United Kingdom ..................... 5/481
2045073A 10/1980 United Kingdom ..................... 5/481

Primary Examiner—Alexander Grosz
Attorney, Agent, or Firm—Dennison, Meserole, Pollack & Scheiner

[57] ABSTRACT

A mattress or pillow for hospital use generally consisting of a core of parallel-epipedic shape formed of elastic plastic having open cells, a layer of elastic plastic having open cells secured by heat-lamination to said core but having a shorter solidification time than the core. Said construction then being entirely covered by a protective film formed of a plastic which is heat-laminated to the layer of elastic plastic and which is easy to clean and disinfect.

2 Claims, 1 Drawing Figure

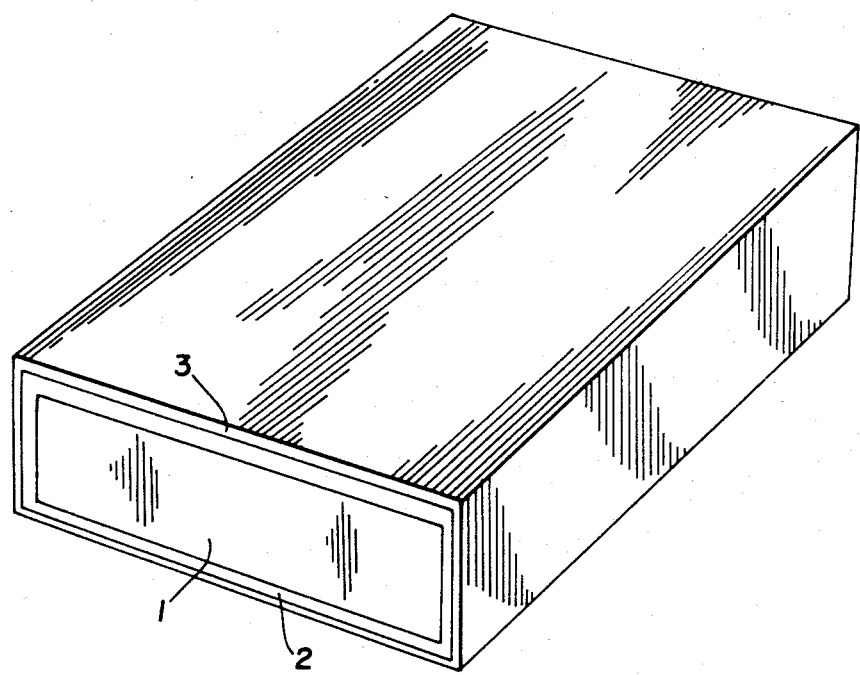

MATTRESS OR PILLOW CONSTRUCTION

The present invention relates to a product, preferably a mattress, pillow or the like, of elastic plastic material having predominantly open cells. The plastic may be a polyether or a cold-foamed polyether known as cold foam. A plastic according to the present invention is described in the following material specification, for instance. The product primarily concerned here is a pillow or mattress. Such a product is manufactured in parallel-epipedic form. When such a pillow or mattress is to be used in nursing care it is advisable for it to be provided with a casing which entirely or partially covers the product. The casing is generally permanently fixed to the mattress or pillow, preferably by means of heat-lamination. The casing generally consists of a plastic having the nature of a foil or film. The plastic shall be of a type enabling the pillow or mattress provided therewith to be easily disinfected and cleaned from dirt particles without it being necessary to change the casing is. The casing suitably formed from a polyurethane. A casing suitable for the present invention is described in the following material specification. When a pillow or mattress of the type described above is to be provided with a casing by means of heat-lamination, it has been found that the plastic in the product itself requires approximately 24 hours for curing and this is far too long a time to permit economical factory manufacture of pillows and mattresses with protective casings.

The object of the present invention is to eliminate said long manufacturing time, reducing the time so that the product can continue to another stage of manufacture immediately. This is achieved by arranging a layer of elastic plastic having predominantly open cells between the casing and the product, said plastic being of a type requiring a considerably shorter curing time than the plastic in the product itself. The plastic preferably consists of a polyester. A plastic in accordance with the present invention, which is suitable for the layer, is described in the following material specification. A suitable layer thickness is 1.42–4 mm.

The present invention will be further described with reference to the accompanying drawing showing a perspective view of a mattress according to the present invention.

1 is a parallel-epipedic body which is intended to constitute the core of a mattress. The body is manufactured from polyether and is provided with open cells. The physical properties of the care body are mentioned in the two examples, Tables I and II. A layer 2 of an elastic plastic having predominantly open cells is arranged around the body. The physical properties of this plastic are revealed in Table V. The inside of the layer is heated prior to application. After application, the outer surface of the layer is also heated, after which a plastic film or foil 3 is applied on the layer 2. The finished mattress requires a curing time of about 2 hours before the heated surfaces have solidified. The outer layer or foil 3 has physical properties which are described in Tables III and IV. The use of an intermediate layer of elastic plastic with open cells enables the manufacturing time to be reduced to less than one tenth and satisfactory adhesion is obtained between the various layers despite the intermediate layer consisting of an elastic plastic with open cells.

TABLE I

MATERIAL SPECIFICATION RELATING TO CORE BODY
Example 1

| | |
|---|---|
| Quality | F30 |
| Color | Grey |
| Standard Width | 2000 mm |
| Total Height | 1040 mm +/−3% |
| Shoulder Height | 880 mm +/−3% |
| Bulk Density | Gr. pr. kg/m$^3$ +/−5% |
| ISO 1855/SIS 169209/DIN 53420 | Net pr. kg/m$^3$ +/−5% 27 |
| Hardness Indes (50 mm) ISO 2439/SIS 169212/DIN 53576 | 150 N+/−4% |
| Dynamic Fatique ISO 3385/SIS 169214/DIN 53574 | 50 N |
| Height Loss | 3.0% |
| Elongation ISO 1798/SIS 169211/DIN 53571 | 240% |
| Elongation at break | 100 kPa |
| Deformation ISO 1856/SIS 169213/DIN 53572 | 4.0% |
| Elasticity SIS 169217 | 46% |
| Impact Strength ISO 3386/DIN 53577 | 3.3 kPa +/−6% |
| Field of Application | LAMINATION |
| Comments | |
| Fulfills requirements for FMVSS 302/1972 pt. 4.3 - laminatable | |

TABLE II

Example 2

| | |
|---|---|
| Quality | HE37 |
| Color | White |
| Standard Width | 2000 mm |
| Total Height | 860 mm +/−3% |
| Shoulder Height | 700 mm +/−3% |
| Bulk Density | Gr. pr. kg/M$^3$ +/−4% 38 |
| ISO 1855/SIS 169209/DIN 53420 | Net pr. kg/m$^3$ +/−4% 36 |
| Hardness Index (50 mm) ISO 2439/SIS 169212/DIN 53576 | 150 N +/−4% |
| Dynamic Fatigue | 30 N |
| Height Loss ISO 3385/SIS 169212/DIN 53574 | 1.5% |
| Elongation ISO 1798/SIS 169211/DIN 53571 | 220% |
| Elongation at Break | 110 kPa |
| Deformation ISO 1856/SIS 169213/DIN 53572 | 2.0% |
| Elasticity SIS 169217 | 58% |
| Impact Strength SO 3386/DIN 53577 | 3.6 kPa +/−6% |
| Field of Application | |
| Cushions, Office and Dining-room Furniture, Mattresses | |
| Comments | |
| Fulfills requirements for Bulletin 117 sec. A & D STATE OF CALIFORNIA. | |
| Mattress 90 nm in thickness fulfilled the highest requirements for furniture. | |

TABLE III

Material specification relating to casing
Example 1
Physical properties

| Test | Standard ASTM | TF-310-312-330-800 Polyester | | TF-410 Polyether | |
|---|---|---|---|---|---|
| | | 1 Mil | 3–5 Mil | 1 Mil | 3–5 Mil |
| Specific Gravity | D-792 | 1.22 | 1.22 | 1.14 | 1.14 |

TABLE III-continued

Material specification relating to casing
Example 1
Physical properties

| Test | Standard ASTM | | TF-310-312-330-800 Polyester 1 Mil | TF-310-312-330-800 Polyester 3-5 Mil | TF-410 Polyether 1 Mil | TF-410 Polyether 3-5 Mil |
|---|---|---|---|---|---|---|
| Hardness Shore, A | D-2240 | | 93(50D) | 93(50D) | 82 | 82 |
| Stress-Strain | D-883 | | | | | |
| Ultimate Strength psi(MPA) | | MD* | 9000(62.1) | 8500(58.7) | 6000(41.4) | 6500(44.8) |
| | | TD* | 5000(34.5) | 8100(55.9) | 3000(20.7) | 5200(35.9) |
| 100% Modulus, psi(MPA) | | MD | 3000(20.7) | 1600(11.4) | 1700(11.7) | 800(5.5) |
| | | TD | 1100(7.6) | 1600(11.0) | 530(3.7) | 660(4.6) |
| 300% Modulus, psi(MPA) | | MD | | 4900(33.8) | | 1500(10.3) |
| | | TD | | 4800(33.1) | | 1100(7.6) |
| Elongation at Break, % | | MD | 200 | 410 | 350 | 570 |
| | | TD | 400 | 410 | 650 | 630 |
| Tear initiation, Graves, lb/in(kg/cm) | D-1004 | MD | 250(44.8) | 500(107.4) | 250(44.8) | 430(77.0) |
| | | TD | 500(89.5) | 560(100.2) | 380(68.0) | 420(75.2) |
| Tear Propagation, lb/in(kg/cm) | D-1938 | MD | 250(46.5) | 500(89.5) | 260(46.5) | 212(37.9) |
| | | TD | 400(71.6) | 560(100.2) | 250(44.8) | 272(48.7) |
| Moisture Vapor Transmission, gm/24 hr/100 sq. in. | E-95-E | | 46 | 23 | 76 | 43 |
| Abrasion Resistance, Taber CS-17 5000 Cycles; 1,000 gm load; 75 mil sample; mg lost Taber | | | 3 | 3 | 8 (1000 cycles) | |
| Impact Strength lb/in(kg/cm) | D-1709 | | 400(71.7) | 400(71.7) | 390(69.9) | |
| Permeation Properties | | | | | | |
| Gas transmission rate, cc/24 hr/100 sq. in. | D-1434 | | | | | |
| Oxygen | | | 75 | 72 | 1000 | 542 |
| Nitrogen | | | 45 | 18 | 450 | 151 |
| Carbon Dioxide | | | 450 | 729 | 4300 | 6902 |
| Air | | | 55 | 28 | NA | 214 |
| Helium | | | NA | 349 | NA | 1188 |
| MVT gm/mil/24 hr/100 sq. in. | E-96-E | | 8.6 | | 1.86 | |
| Thermal Properties (.075" sample) Solenoid Brittle pt. °F.(°C.) | D-746 | | −80(−62) | | −100(−73) | |
| Masland Cold Crack, °F.(°C.) | D-1790 | | −100(−73) | | −100(−73) | |
| Gehman Stiffness Modulus, psi(mpa) | D-1053 | | | | | |
| @ Room Temp. | | | 1700(11.7) | | 570(4.1) | |
| @ 32° F.(0° C.) | | | 2800(19.3) | | 750(5.2) | |
| @ 0° F.(−17.8° C.) | | | 17500(120.7) | | 1000(6.9) | |
| @ −40° F.(−40° C.) | | | — | | 5900(40.7) | |
| Heat Seal Range | | | | | | |
| °F. | | | 350–400 | | 350–400 | |
| °C. | | | 176–204 | | 176–204 | |

N.A. Data not available

TABLE IV

Immersion data
28 days @ 23° C. (73° F.) 5 mil film

| Test—Base Material— | Ultimate Tensile psi Ester | Ultimate Tensile psi Ether | Tensile Change (%) Ester | Tensile Change (%) Ether | Ultimate Elong (%) Ester | Ultimate Elong (%) Ether |
|---|---|---|---|---|---|---|
| Original | 8500 | 5400 | — | — | 410 | 570 |
| ASTM Fuel A | 7900 | 6500 | −71 | 0 | 405 | 610 |
| ASTM Fuel B | 6200 | 4300 | −27 | −34 | 460 | 150 |
| ASTM Fuel C | 7000 | 3800 | −17 | −42 | 510 | 590 |
| ASTM Oil Type 1 | 8100 | NA | −6 | NA | 380 | NA |
| ASTM Oil Type 2 | 6700 | 6850 | −21 | +4.6 | 390 | 590 |
| ASTM Oil Type 3 | 7400 | 3900 | −13 | −40 | 430 | 540 |
| Perchloroethylene | 6500 | 3000 | −24 | −54 | 420 | 510 |
| Trichloroethylene | 4800 | 2000 | −44 | −69 | 460 | 420 |
| Benzene | 5500 | 3300 | −35 | −49 | 500 | 670 |
| MEK | 3600 | * | −58 | * | 550 | * |
| Isopropyl Alcohol | 5300 | 300 | −38 | −95 | 510 | 670 |
| Saturated NaCl | 7500 | 5300 | −12 | −18 | 410 | 560 |
| Ethylene Glycol | 6800 | 5650 | −20 | −13 | 420 | 650 |
| 20% NaOH | * | 4800 | * | −26 | * | 620 |
| 20% H₂SO₄ | 6600 | 2500 | −22 | −26 | 465 | 450 |
| 50% Formic Acid | * | 2600 | * | −60 | * | 680 |
| Synthetic Perspiration | 7300 | 5200 | −14 | −20 | 400 | 585 |
| H₂O @ 70° C. (158° F.) | 3500 | 5200 | −59 | −20 | 450 | 680 |
| 95% RH @ 70° C.(150° F.) | 1400 | 3700 | −83 | −43 | 170 | 620 |

Immersion data
28 days @ 23° C. (73° F.) 5 mil film

| Test—Base Material— | Elong Change (%) Ester | Elong Change (%) Ether | Volume Change (%) Ester | Volume Change (%) Ether | Weight Change (%) Ester | Weight Change (%) Ether |
|---|---|---|---|---|---|---|
| Original | — | — | — | — | — | — |
| ASTM Fuel A | −1.2 | +7.0 | +1.7 | +4.7 | −0.1 | +2.1 |
| ASTM Fuel B | +12 | +7.0 | +8.7 | +18 | +8.3 | +16 |
| ASTM Fuel C | +24 | +3.5 | +10 | +34 | +9 | +30 |
| ASTM Oil Type 1 | −7 | NA | +13 | NA | +1.5 | — |
| ASTM Oil | −4.9 | +3.5 | +0.3 | +5.0 | +.4 | +4.5 |

TABLE IV-continued

| | | | | | | |
|---|---|---|---|---|---|---|
| Type 2 | | | | | | |
| ASTM Oil | +4.9 | −5.3 | +3.2 | +11 | +2.4 | +10 |
| Type 3 | | | | | | |
| Perchloro-ethylene | +15 | −10.5 | +20 | +73 | +22 | +94 |
| Trichloro-ethylene | +12 | −26 | +54 | +242 | +51 | +270 |
| Benzene | +22 | +17 | +38 | +108 | +30 | +95 |
| MEK | +34 | * | * | +30 | * | +27 |
| Isopropyl Alcohol | +24 | +17 | +11 | +34 | +9 | +26 |
| Saturated NaCl | 0 | −1.8 | −0.7 | NA | −0.6 | — |
| Ethylene Glycol | +2.4 | +14 | +4 | +4 | +4 | +4 |
| 20% NaOH | * | +8.8 | −27 | +5 | −27 | +6 |
| 20% H$_2$SO$_4$ | 13.4 | −2.1 | +0.7 | +1.4 | +1.2 | +2.1 |
| 50% Formic Acid | * | +19 | * | −17 | — | +6 |
| Synthetic Perspiration | +2.4 | +2.6 | +2.3 | * | — | +1.3 |
| H$_2$O @ 70° C. (158° F.) | +9.8 | +19 | +0.4 | NA | +1.6 | NA |
| 95% RH @ 70° C.(150° F.) | −59 | +8.7 | — | — | — | — |

Physical Properties
Flame Retardant
Polyether Base Material

| | Typical Properties | ASTM Test Procedure |
|---|---|---|
| UL Vertical 94 Flame Test | V O | — |
| Tensile, psi | 4700 | D412 |
| 100% Modulus, psi | 850 | — |
| 300% Modulus, psi | 1350 | — |
| Elongation, % | 570 | — |
| Graves Tear, pli | 370 | D624 |
| Crescent Tear, pli | 460 | D624 |
| Hardness, A-C-D | 87-58-41 | D2240 |
| Taber Abrasion, mgm loss, CS-17 wheel, 1000 gm, 1000 cycles | 6.2 | — |
| Vicat B, °C. | 94 | D1525 |
| Brittleness Temp | −70° C. | D746 |
| Gehman RT Modulus | 1250 | D1053 |
| T$_2$ | −15° C. | — |
| T$_5$ | −31° C. | — |
| T$_{10}$ | −37° C. | — |
| T$_{50}$ | −51° C. | — |
| T$_{100}$ | — | — |
| Freeze Point | −51° C. | — |
| Compression Set, 22 hours, RT | 23% | D395 |
| Compression Set, 22 hours, 70° C. | 66% | — |
| Specific Gravity | 1.226 | — |

*sample dissolved
NA — Data not available

TABLE V

Material specification concerning intermediate layer.
PRODUCT DESCRIPTION
For types 2130170 and 2333170

| | 2130170 | 2333170 |
|---|---|---|
| Weight of sample SIS 169209 kg/m$^3$ ± 6% | 28.0 | 31.0 |
| Hardness index SIS 169212 N ± 16% | 170 | 170 |
| Ultimate strength SIS 169211 kPa, typical value | 231 | 246 |
| Elongation at break SIS 169211 %, typical value | 240 | 235 |
| Tear strength ASTM D 1564 N/cm, typical value | 6.9 | 6.7 |
| Deformation SIS 169213 (75%, 70° C., 22 h) %, typical value | 7 | 9 |
| Flame retardant standard | — | MVSS 302 |

There is no entirely satisfactory exactitude with respect to the distribution of open and closed cells. The ratio also tended to vary somewhat from production to production.

However, it can be assumed that polyether foam normally has a proportion of open cells in excess of 95% whereas polyester foam normally tends to have a proportion of more than 80%.

Typically it can be assumed that polyester foam (with respect to the types described) has about 90% open cells but, as mentioned, with slight variation from production to production.

I claim:

1. A mattress, pillow, or the like, having a core formed of an elastic plastic material having a predominant portion of open cells, a thin layer of soft elastic plastic polyester material having predominately open cells and a short curing time said plastic thin layer completely covering said core and being permanently joined to said core by means of heat-lamination and necessitating minimum solidification time, a polyurethane plastic film which is easy to disinfect and clean, entirely covering and permanently fixed by heat-lamination to said thin layer of soft elastic plastic.

2. A mattress, pillow, or the like as defined in claim 1 wherein said thin layer of soft elastic plastic has a thickness of from 1.42 to 4 mm.

* * * * *